(12) United States Patent
Jun

(10) Patent No.: US 7,199,850 B2
(45) Date of Patent: Apr. 3, 2007

(54) LIQUID CRYSTAL DISPLAY HAVING OBLIQUE DOMAIN SIDE AND WIDE VIEWING ANGLE

(75) Inventor: Sahng-Ik Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 192 days.

(21) Appl. No.: 10/159,476

(22) Filed: May 31, 2002

(65) Prior Publication Data

US 2003/0071951 A1  Apr. 17, 2003

(30) Foreign Application Priority Data

Oct. 12, 2001 (KR) ................................ 2001-63097

(51) Int. Cl.
*G02F 1/1337* (2006.01)
*G02F 1/1343* (2006.01)
(52) U.S. Cl. ........................ 349/139; 349/129
(58) Field of Classification Search .................. 349/38, 349/39, 129, 130, 141, 143, 192
See application file for complete search history.

(56) References Cited

U.S. PATENT DOCUMENTS

| | | | | |
|---|---|---|---|---|
| 5,897,182 A | * | 4/1999 | Miyawaki | 349/43 |
| 6,100,953 A | * | 8/2000 | Kim et al. | 349/129 |
| 6,449,025 B2 | * | 9/2002 | Lee | 349/129 |
| 6,456,351 B1 | * | 9/2002 | Kim et al. | 349/141 |
| 6,462,798 B1 | * | 10/2002 | Kim et al. | 349/129 |
| 6,630,976 B2 | * | 10/2003 | Ahn et al. | 349/139 |
| 6,654,090 B1 | * | 11/2003 | Kim et al. | 349/129 |

* cited by examiner

*Primary Examiner*—Andrew Schechter
*Assistant Examiner*—Michael H. Caley
(74) *Attorney, Agent, or Firm*—F. Chau & Associates, LLC

(57) ABSTRACT

A liquid crystal display having a partitioned pixel electrode and a common electrode with apertures. The pixel electrode is formed in a pixel area defined by intersections of gate lines and data lines over a first substrate, and includes a plurality of partitions and a plurality of connecting members connecting the partitions. The common electrode is formed on a second substrate opposite the first substrate, and has a plurality of apertures forming means for defining domains along with the partitions of the pixel electrode. Each domain has two long sides perpendicular or parallel to the gate lines, short sides perpendicular to the long sides, and oblique sides which make an angle of about 120 to about 150 degrees or about 135 to about 180 degrees with the long sides. A drain electrode extends so that the oblique sides elongated by a repairing connection are not affected by a storage electrode.

22 Claims, 17 Drawing Sheets

Polarizing axes

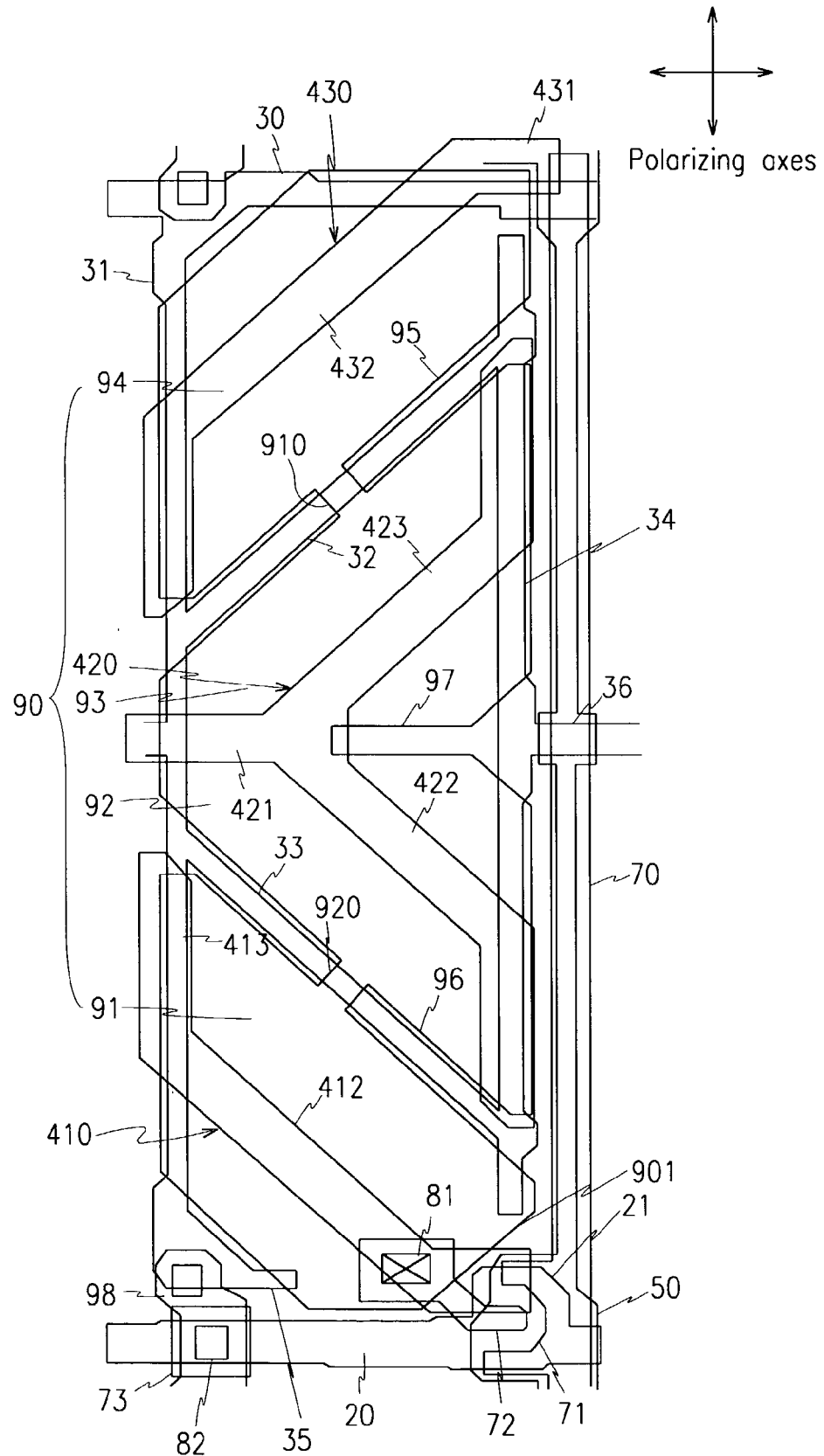

LIQUID CRYSTAL DISPLAY HAVING OBLIQUE DOMAIN SIDE AND WIDE VIEWING ANGLE

BACKGROUND OF THE INVENTION (a) Field of the Invention

The present invention relates to a liquid crystal display having wide viewing angle, and more particularly, to a liquid crystal display having a pixel structure for reducing textures.

(b) Description of the Related Art

In general, a liquid crystal display (LCD) has an upper panel including a common electrode and a plurality of color filters, a lower panel including a plurality of thin film transistors (TFTs) and a plurality of pixel electrodes, and a liquid crystal layer having liquid crystal molecules disposed therebetween. The pixel electrodes and the common electrode are applied with electrical voltages to generate an electric field to vary the orientation of the liquid crystal molecules, thereby controlling the transmittance of light passing through the liquid crystal layer.

Conventional LCDs typically have a disadvantage of narrow viewing angle, i.e., view of the LCDs would be difficult at an angle larger than the viewing angle. Various techniques for widening the viewing angle have been developed. One of the techniques is to form apertures or protrusions in the pixel electrodes and the common electrode opposite the pixel electrodes, and to control the tilt directions of liquid crystal molecules by using the fringe field generated by the apertures or the protrusion, thereby providing several domains.

A domain preferably has the shape of a long stripe for improving the fringe field effect and the response time, and thus the planar shape of a domain has two long sides and two short sides.

However, this conventional LCD is disadvantageous from a first type of texture generated at the short sides of the domain, a second type of texture in the shape of kidney generated at the center of a pixel, and a third type of texture generated at the chamfered corner of the domain adjacent to a repairing connection. Thus, it is desirable to reduce generation of the textures, thereby enhancing the image quality of an LCD.

SUMMARY OF THE INVENTION

This object is accomplished by making an oblique side of a domain defined by partitions of a pixel electrode and apertures of a common electrode to have longer length than short sides of the domains.

According to an aspect of the present invention, an LCD includes a pixel electrode having a plurality of partitions connected to each other; and a common electrode opposite the pixel electrode, the common electrode generating electric field along with the pixel electrode and having a plurality of apertures, the plurality of partitions and the plurality of apertures defining at least one domain, wherein the at least one domain has a first side, a second side perpendicular to the first side and having a shorter length than the first side, and a third side oblique to the first side, wherein the third side is longer than the second side.

According to an embodiment of the present invention, the liquid crystal display further includes: a gate line for transmitting a first signal and a data line for transmitting a second signal, the gate line insulated from but intersecting the data line; a first wire adjacent to the pixel electrode and applied with a voltage different from a voltage applied to the pixel electrode, a repairing connection intersecting the gate line and overlapping a part of the first wire, and a switching element, connected to the gate line, the data line, and the pixel electrode, for supplying the second signal from the data line for the pixel electrode in response to the first signal from the gate line. The third side is formed with a stairs shape and includes a portion parallel to the gate line or the data line. A portion of the switching element extends between the pixel electrode and the first wire. At least one of connecting members connecting the plurality of partitions of the pixel electrode substantially covers the first wire. The third side includes an edge of the apertures of the common electrode or a chamfered corner of the plurality of partitions of the pixel electrode. The third side curves at an angle of about 120 to about 150 degrees with the first side. The third side curves at an angle of about 135 to about 180 degrees with the first side.

According to another aspect of the present invention, a panel for LCD includes a pixel electrode, a first wire, and a switching element. The pixel electrode has a plurality of partitions connected to each other, and the first wire is adjacent to the pixel electrode. A voltage applied to the first wire is different from the voltage applied to the pixel electrode. The switching element is connected to the pixel electrode and supplies a signal for the pixel electrode. A portion of the switching element extends between the pixel electrode and the first wire. In addition, data and gate lines for transmitting signals are formed in the panel, and they are insulated from but intersecting each other.

It is preferable that at least one of connecting members connecting the plurality of partitions of the pixel electrode covers the first wire.

In addition, the first sides are formed by cutting off corners of the partitions in the pixel electrode in an oblique direction, which is not parallel to the gate and data lines. It is preferable that at least one of the first sides includes a portion parallel to the gate line or the data line, and is formed in stepwise manner.

According to still another aspect of the present invention, a panel for LCD includes a pixel electrode connected to gate and data lines through a switching element. The pixel electrode includes a plurality of partitions connected to each other, and at least one of corners of at least one of the plurality of partitions of the pixel electrode includes a first side formed by being cut off in an oblique direction that is not parallel to the gate and data lines. The first side includes a portion parallel to the gate line or the data line and is formed with a stairs shape.

In addition, a first wire adjacent to the pixel electrode is formed in the panel, and a voltage applied to the first wire is different from the voltage applied to the pixel electrode.

It is preferable that at least one of connecting members connecting the plurality of partitions of the pixel electrode covers the first wire.

Alternatively, it is preferable that a portion of the switching element extends the pixel electrode and the first wire.

According to still another aspect of the present invention, an LCD includes a pixel electrode and a common electrode having a plurality of apertures. The pixel electrode has a plurality of partitions divided by linear openings and a connecting member connecting the plurality of partitions. The common electrode is opposite the pixel electrode and generates the electric field along with the pixel electrode. The partitions of the pixel electrode and the apertures of the common electrode define domains. Each domain is in a polygonal shape obliquely extending with respect to a gate or data line. The connecting member is located at the center of the linear aperture.

In addition, a first wire adjacent to the pixel electrode is formed in the LCD, and a voltage applied to the first wire is different from the voltage applied to the pixel electrode.

It is preferable that a portion of the first wire is covered with the pixel electrode. Alternatively, it is preferable that a portion of the first wire is located at the linear apertures.

In addition, the first wire extends to connect two pixels.

According to still another aspect of the present invention, a method of fabricating a thin film transistor array panel for a liquid crystal display is provided, the method includes the steps of: forming a gate wire on an insulating substrate, the gate wire including a gate line and a gate electrode connected to the gate line; forming a gate insulating layer on the insulating substrate having the gate wire; forming a semiconductor layer on the gate insulating layer; forming a data wire and a buffer, the data wire including a data line crossing over the gate line, a source electrode connected to the data line, and a drain electrode placed opposite to the source electrodes with respect to the gate electrode; depositing a passivation layer onto the insulating substrate having the data wire and the buffer; patterning the passivation layer to form a first contact hole and a second contact hole exposing the drain electrode and the buffer, respectively; and forming a pixel electrode and a repairing connection on the passivation layer, the pixel electrode electrically connecting to the drain electrodes through the first contact hole and the repairing connection intersecting the gate line and electrically connecting to the buffer through the second contact hole, wherein the pixel electrode has a plurality of partitions connected to each other and the drain electrode extends between the pixel electrode and the data wire for transmitting image signals.

According to an embodiment of the present invention, the method further includes the step of forming ohmic contact layers on the semiconductor layer, wherein the ohmic contact layers are separated each other. The ohmic contact layers are made of amorphous silicon doped N-type impurity. The pixel electrode is made of ITO (indium tin oxide) or IZO (indium zinc oxide).

BRIEF DESCRIPTION OF THE DRAWINGS

The above and other objects and advantages of the present invention will become more apparent by describing in detail preferred embodiments thereof with reference to the accompanying drawings in which:

FIGS. 1A to 5A are layout views of TFT array panels for LCDs according to first to fifth embodiments of the present invention, respectively;

FIGS. 1B to 5B are layout views of color filter array panels for LCDs according to first to fifth embodiments of the present invention, respectively;

FIGS. 1C to 5C are layout views of LCDs according to first to fifth embodiments of the present invention, respectively;

DETAILED DESCRIPTION OF PREFERRED EMBODIMENTS

Figure 1A:
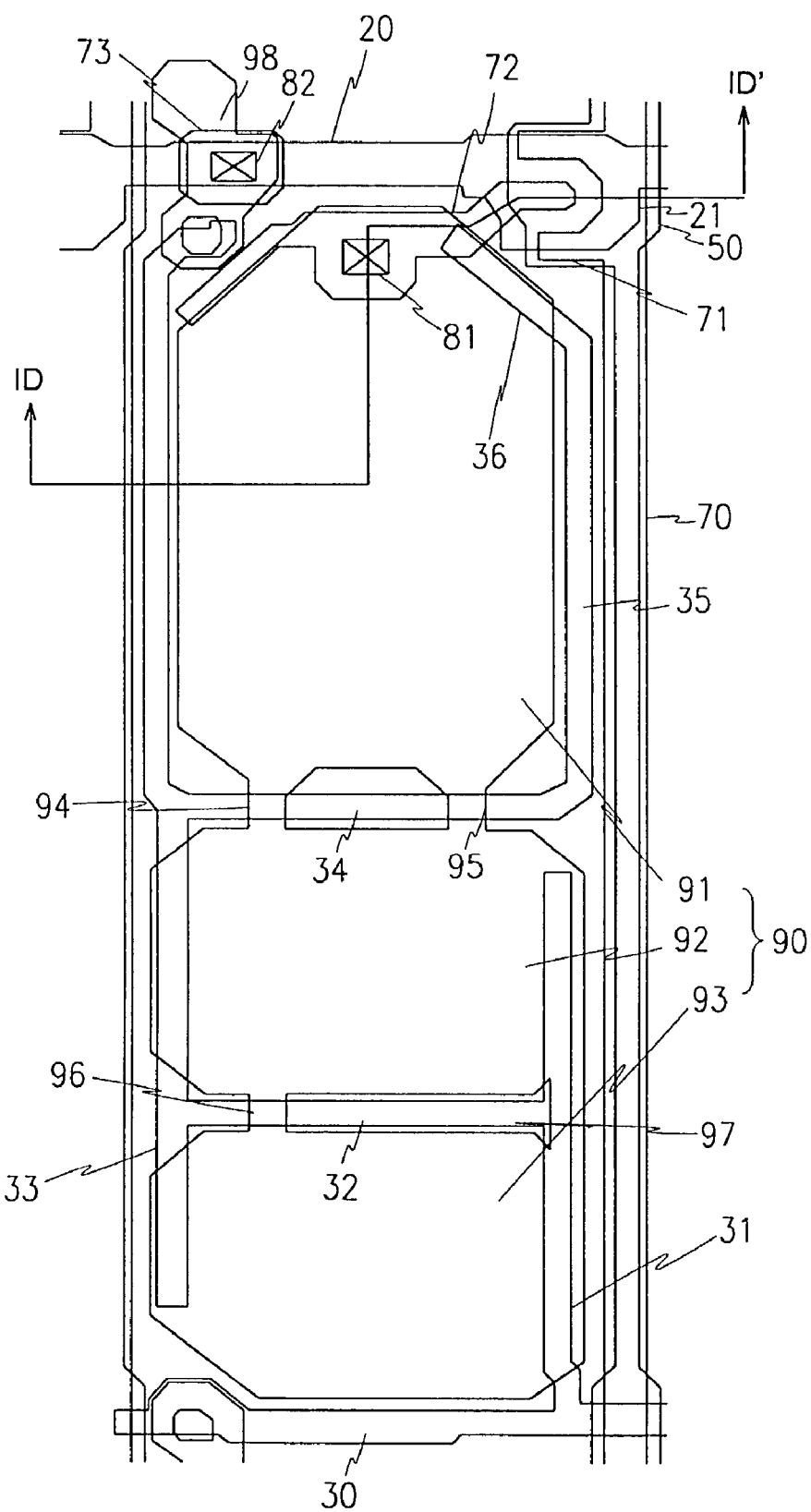

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

LCDs according to embodiments of the present invention will be described with reference to the drawings.

First to third embodiments of the present invention have transversely or longitudinally extending apertures (hereinafter referred to as "T-shaped apertures") of a common electrode, and forth and fifth embodiments of the present invention have obliquely extending apertures (hereinafter referred to as "chevron-shaped apertures") of a common electrode.

Figure 1B:
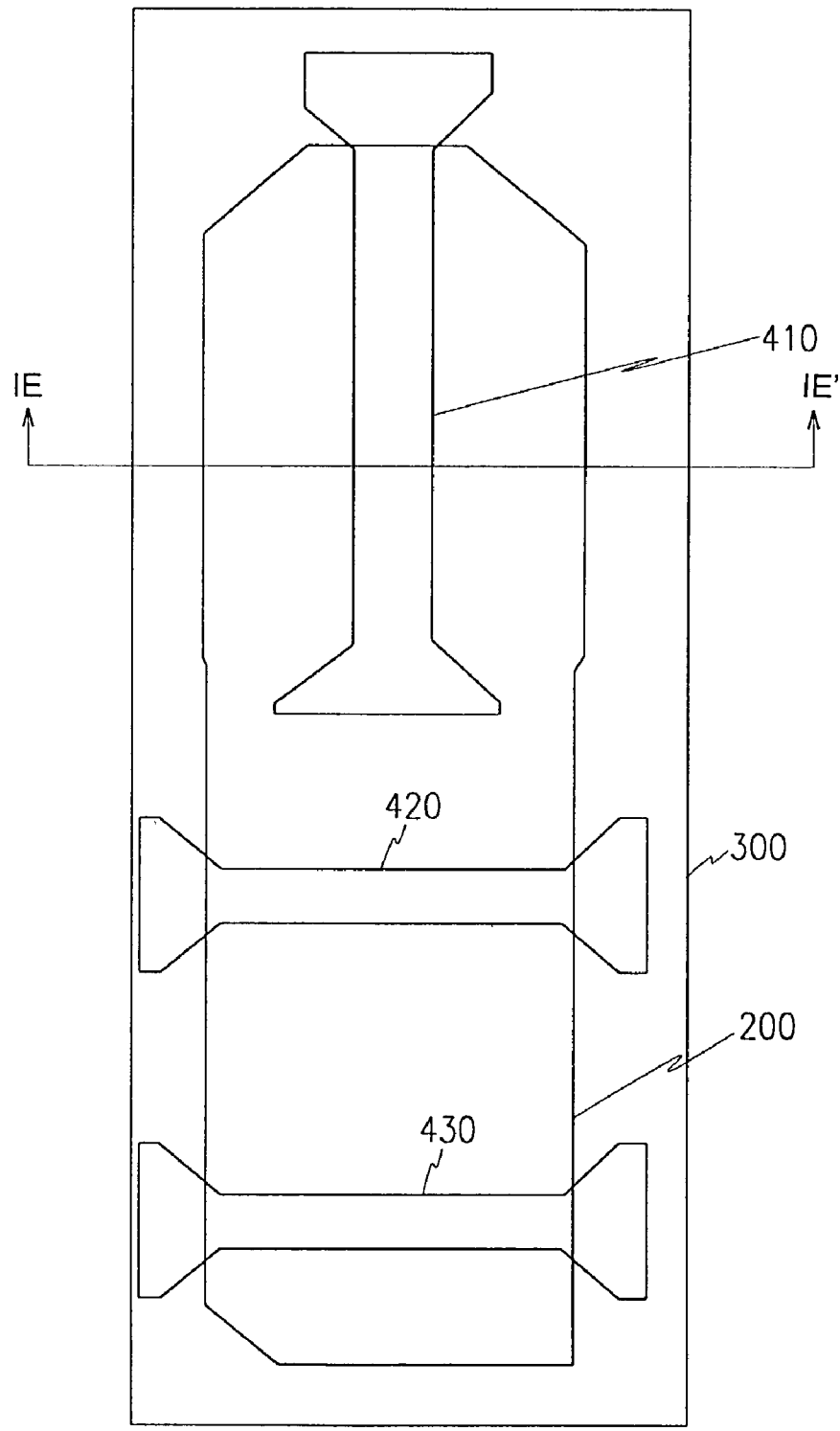
Figure 1C:
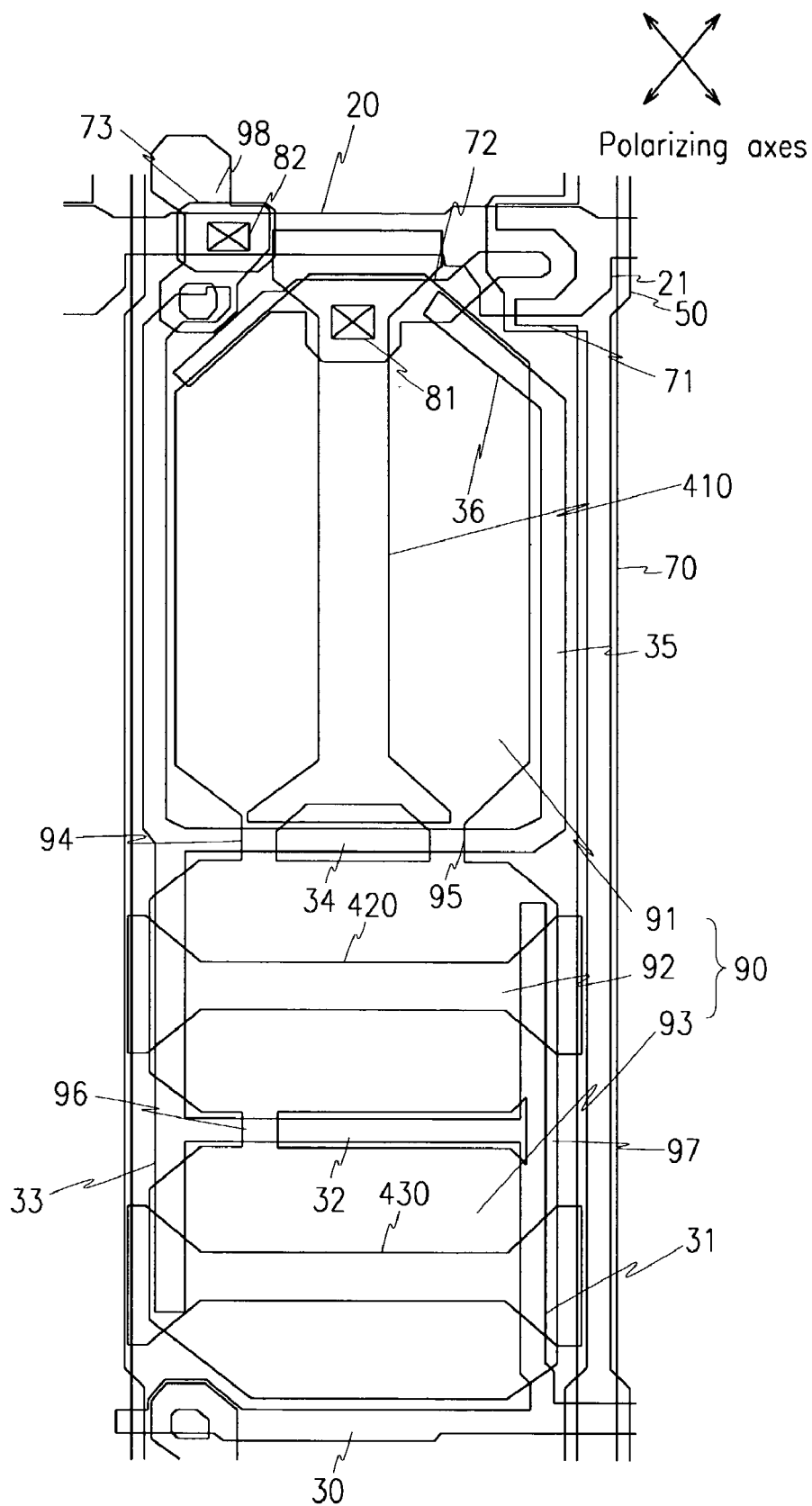
Figure 1D:
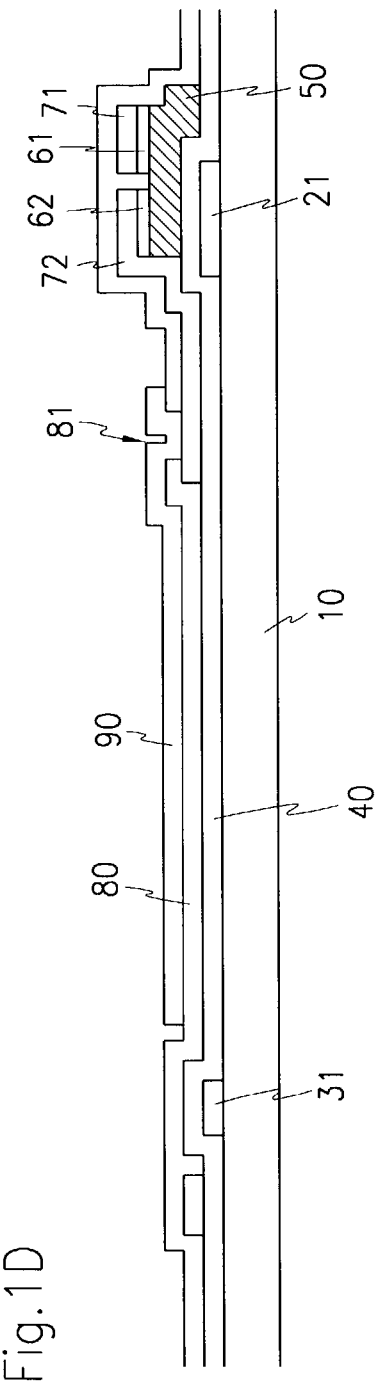
FIG. 1D is a cross-sectional view of the TFT array panel taken along the line ID–ID' of FIG. 1A.
Figure 1E:
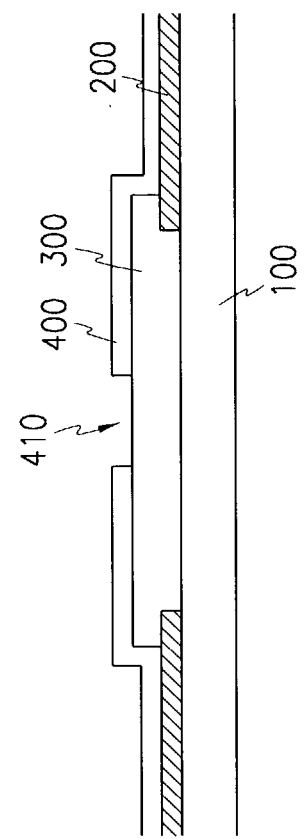
FIG. 1E is a cross-sectional view of the color filter array panel taken along the line IE–IE' of FIG. 1B.
Figure 1F:
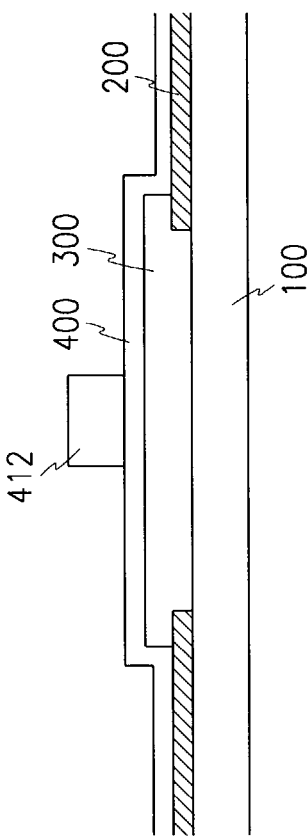
FIG. 1F shows a modified example of the color filter array panel shown in FIG. 1E.

FIGS. 1A, 1B, and 1C are layout views of a TFT array panel, a color filter array panel and an LCD manufactured by assembling the panels according to the first embodiment of the present invention, respectively. FIGS. 1D and 1E are sectional views taken along lines ID–ID' and IE–IE' of FIGS. 1A and 1B, respectively. FIG. 1F is another sectional view taken along line IE–IE' of FIG. 1B.

Now, a TFT array panel for an LCD according to the first embodiment will be described with reference to FIGS. 1A and 1D.

A gate wire including a gate line 20 and a gate electrode 21 for transmitting scanning signals or gate signals, and a storage electrode wire including a storage electrode line 30 and first to sixth storage electrodes 31–36 applied with a reference voltage such as a common voltage are formed on an insulating substrate 10, preferably made of transparent glass. The gate line 20 extends in a transverse direction and a gate electrode 21 extends upward and downward from the gate line 20. The storage electrode line 30 is in parallel to the gate line 20, and the first to sixth storage electrodes 31–36 are branches of the storage electrode line 30. The first storage electrode 31 having an end directly connected to the storage electrode line 30 extends in a longitudinal direction. One end of the second storage electrode 32 extending in the transverse direction is connected to substantially a midpoint of the first storage electrode 31, while the other end of the second storage electrode 32 is connected to the third storage electrode 33 around a lower midpoint and extending in the longitudinal direction. An upper end of the third storage electrode 33 is bent in an oblique direction toward an upper right side. The fourth storage electrode 34 extends in the transverse direction, and has two ends connected to substantially a midpoint of the third storage electrode 33 and to one end of the fifth storage electrode 35, respectively. The other end of the fifth storage electrode 35 is connected to an end of the sixth storage electrode 36, which obliquely extends toward an upper left side.

The gate wire and the storage electrode wire are covered with a gate insulating film 40. A semiconductor layer 50, preferably made of amorphous silicon, is formed on the gate insulating layer 40 opposite the gate electrode 21. Ohmic contact layers 61 and 62, preferably made of amorphous silicon heavily doped with N-type impurity such as phosphorus, are separately formed on the semiconductor layer 50.

A data wire including a plurality of data lines 70 and a source electrode 71 and a drain electrode 72 for transmitting image signals or data signals and a buffer 73 are formed on the gate insulating layer 40 and the ohmic contact layers 61 and 62. The plurality of data lines 70 extends in the longitudinal direction, and a pixel area is defined by intersections of two adjacent data lines 70 and two adjacent gate lines 20. Under the data line 70, the ohmic contact layer 51 and the semiconductor layer 50 also preferably extend along the data line 70, as shown in FIG. 1A. The source electrode 71 and the drain electrode 72 are disposed on the ohmic contact layers 61 and 62, respectively. The source electrode 71 having a U-shape is a branch of the data line 70 and is separated from the drain electrode 72, and a portion of the semiconductor layer 50 disposed between the source and the drain electrodes 71 and 72 is exposed. The drain electrode 72 extends in the transverse direction and is obliquely bent near the third storage electrode 33 toward a lower left direction. The buffer 73 having a rectangular shape is disposed on the gate insulating film 40 and separated from the date wire.

The gate electrode 21, the source electrode 71, and the drain electrode 72 form three terminals of a TFT, which has the portion of the semiconductor layer 50 disposed between the source and the drain electrodes 71 and 72 as a channel layer. The TFT is connected to the gate line 20, the data line 70, and the pixel electrode 90, and transmits the image signals from the data line 70 to the pixel electrode 90 in response to the scanning signals from the gate line 20.

The data wire, the buffer 73, and the exposed portion of the semiconductor layer 50 are covered with a passivation film 80 having contact holes 81 and 82, which expose the drain electrode 72 and a portion of the buffer 73, respectively.

A pixel electrode 90 located in the pixel area and having a rectangular shape, and a repairing connection 98 intersecting the gate line 20 are formed on the passivation film 80. The pixel electrode 90 and the repairing connection 98 are made of transparent conductive material such as ITO (indium tin oxide) and IZO (indium zinc oxide), or opaque conductive material.

The pixel electrode 90 is connected to the drain electrode 72 through the contact hole 81 and the repairing connection 98 is connected to the buffer 73 through the contact hole 82. The repairing connection 98 also extends in the longitudinal direction to overlap the storage electrode line 30 above the buffer 73 and the extended end of the third storage electrode 33 below the buffer 73.

According to an embodiment of the present invention, the pixel electrode 90 is divided into upper, middle, and lower partitions 91, 92, and 93, which are arranged in the longitudinal direction. The upper and the middle partitions 91 and 92 are connected via first and second connecting members 94 and 95, and the middle and the lower partitions 92 and 93 are connected via third and fourth connecting members 96 and 97. The first and the second connecting members 94 and 95 are spaced apart from left and right ends of the fourth storage electrode 34, respectively. The third connecting member 96 is spaced apart from a left end of the second storage electrode 32, and the fourth connecting member 97 is located at a right corer of the pixel electrode. The pixel electrode 90 overlaps the storage electrode wire at least in part to form a storage capacitor.

The upper partition 91 is in the rectangular shape having four chamfered comers located in the substantially upper half portion of the pixel area, and is directly connected to the drain electrode 72 through the contact hole 81. The middle and the lower partitions 92 and 93 are also in the rectangular shapes, each having four chamfered corners, and located in the substantially lower half portion of the pixel area. The fourth and the second storage electrodes 34 and 32 are located between the upper and the middle partitions 91 and 92 and between the middle and the lower partitions 92 and 93, respectively. The upper partition 91 is almost surrounded by the third, the fourth, the fifth, and the sixth storage electrodes 33, 34, 35, and 36. It is preferable that the angles made by the chamfers and the related edges of the partitions 91-93 are in the range of about 120 to about 150 degrees to the long sides, and more preferably about 135 degrees. However, near the boundary between the middle and the lower partitions 92 and 93, the angles are preferably about 135 to about 180 degrees, and more preferably about 150 to about 170 degrees.

The upper left corner of the upper partition 91 and the lower left corner of the lower partition 93 are more chamfered than the other corners to prevent a short-circuit between the pixel electrode 90 and the repairing connection 98, which occupies some areas near the upper left and lower left corners in the pixel area.

Next, a color filter array panel according to the first embodiment of the present invention will be described with reference to FIGS. 1B and 1E.

A black matrix 200 preferably made of organic material is formed on a transparent insulating substrate 100, preferably made of glass to define the pixel area. A color filter 300 is formed in the pixel area of the substrate 100. A common electrode 400 preferably made of transparent conductor is formed on the color filter 300, and preferably covers the entire surface of the substrate 100. The common electrode 400 has first to third apertures 410–430. The first aperture 410 extending in the longitudinal direction divides the substantially upper half of the pixel area into two parts arranged in the transverse direction, and the second and the third apertures 420 and 430 extending in the transverse direction and arranged in the longitudinal direction divide the substantially lower half of the pixel area into three parts arranged in the longitudinal direction. Both ends of each aperture 410, 420 or 430 are gradually enlarged to form substantially isosceles triangles having two chamfered corners. The angles made by the bottom side and both lateral sides of the isosceles triangle are in the range of 30 to 60 degrees, and more preferably 45 degrees.

FIG. 1F shows a modified example of the color filter array panel shown in FIG. 1E, where the aperture 410 shown in FIG. 1E is replaced with a protrusion 412. That is, a common electrode 400 has no aperture, and the protrusion 412 is formed on the common electrode 400. The protrusion 412 is preferably made of organic material.

According to an embodiment of the present invention, the black matrix can be made of a double-layered structure of $Cr/CrO_2$, and the color filter can be formed in the TFT array panel instead.

Then, an LCD according to the first embodiment of the present invention will be described with reference to FIG. 1C.

After the TFT array panel of the FIG. 1A and the color filter array panel of FIG. 1B are assembled, liquid crystal material is injected into the gap between the two panels and vertically aligned, and two polarizers (not shown) are attached to the outer surfaces of the panels so that their polarizing axes are perpendicular to each other, thereby preparing the LCD according to the first embodiment. The angles made by the polarizing axes and the extending direction of the gate line 20 or the data line 30 are about 45 degrees.

When the two panels are aligned, the common electrode 400 of the color filter array panel is opposite the pixel electrode 90 of the TFT array panel and generates an electric field along with the pixel electrode 90. The upper, middle, and lower partitions 91, 92, and 93 of the pixel electrode 90 and the first, second, and third apertures 410, 420, and 430 of the common electrode 400 overlap each other, thereby dividing a pixel region into a number of domains. The pixel region is defined as a portion of the liquid crystal layer between the corresponding pixel areas of both panels. The first aperture 410 extending in the longitudinal direction divides the upper partitions 91 of the pixel electrode 90 into two, left and right domains, and the second and third apertures 420 and 430 extending in the transverse direction divide the middle and the lower partitions 92 and 93 into two, upper and lower domains, respectively. The planar shape of each domain has a long stripe having two long sides, at most two short sides perpendicular to the long sides, and four lateral sides oblique to the long sides. These shapes of the domains are resulted from the chamfers of the upper, middle, and lower partitions 91, 92, and 93 and the triangular ends of the first, second, and third apertures 410, 420, and 430. The long sides of the domains are parallel to the data lines or the gate lines, and make at an angle of about 45 degrees with the polarizing axes of the polarizers.

According to an embodiment of the present invention, the short sides of the domain are not completely removed and the lengths of the oblique sides are determined preferably by considering the misalignment margin and the lengths of the short sides. Because the short sides are shorter than the oblique sides, the force causing the liquid crystal molecules to tilt in the direction parallel to the long sides is less than the force causing the liquid crystal molecules to tilt in the polarizing directions. Complete removal of the short sides of the domain makes the oblique sides longer, thereby reducing the size of the domains, and decreasing aperture ratio and transmittance.

Further, texture in the domain formed over the upper partition 91 is also reduced, because the drain electrode 72 extends between the third storage electrode 33 and the pixel electrode 90, thereby preventing interference by the end of the third storage electrode 33. Furthermore, texture near the oblique sides of the domains is also reduced by covering the connections of the two storage electrodes 33 and 34 or 34 and 35 with the pixel electrode 90.

An LCD according to another embodiment of the present invention will be described.

Figure 2A:
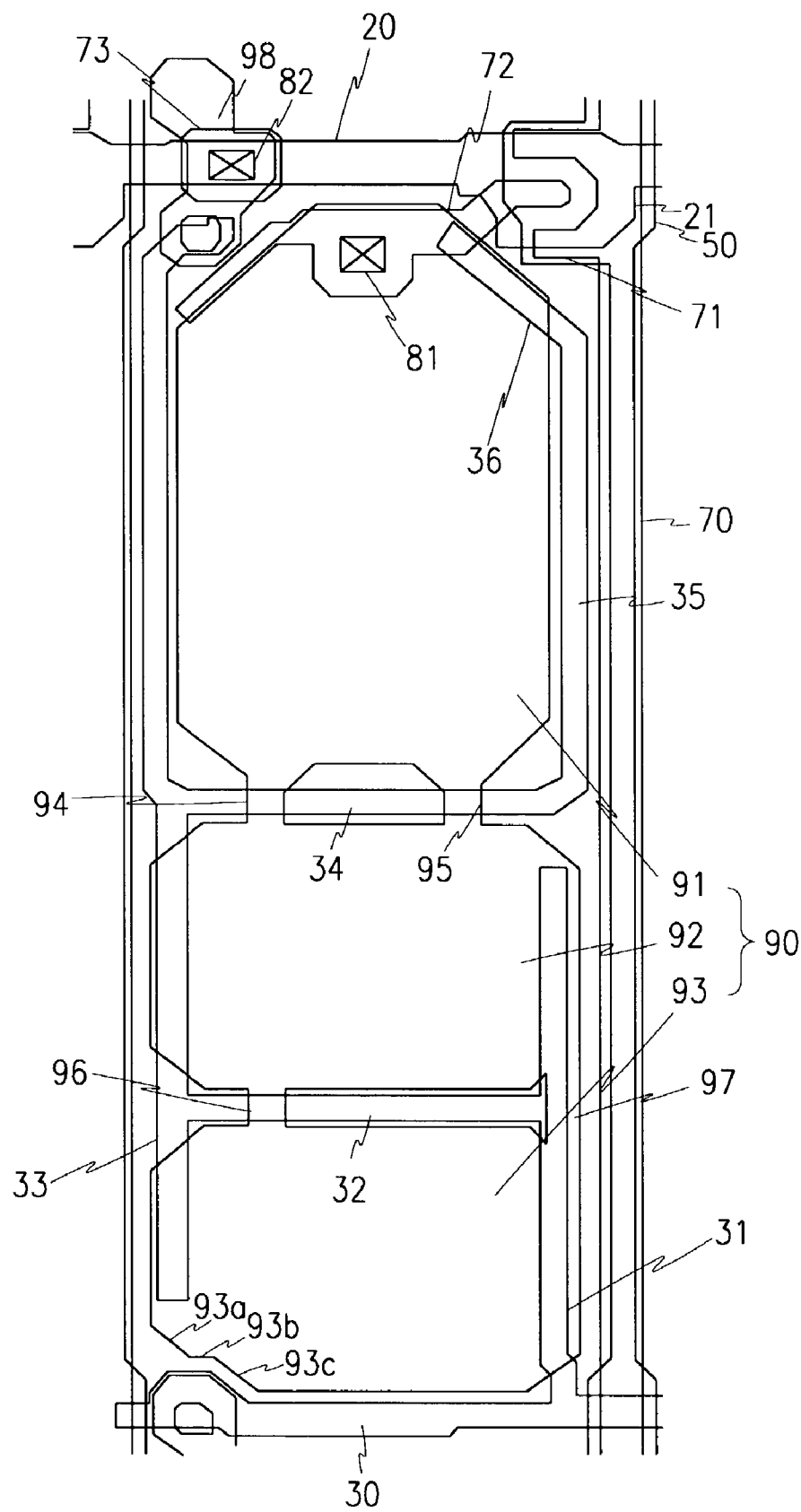
Figure 2B:
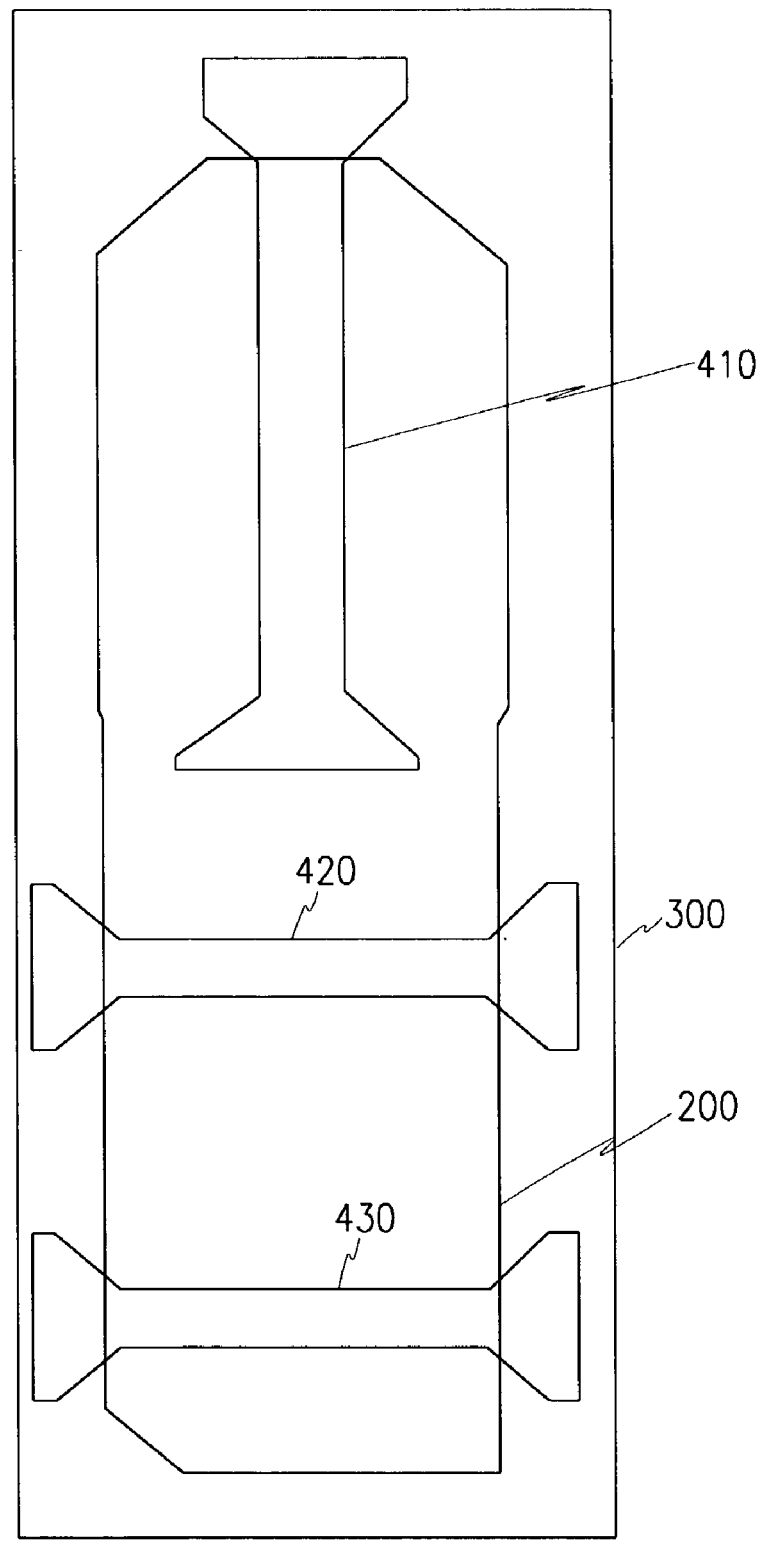
Figure 2C:
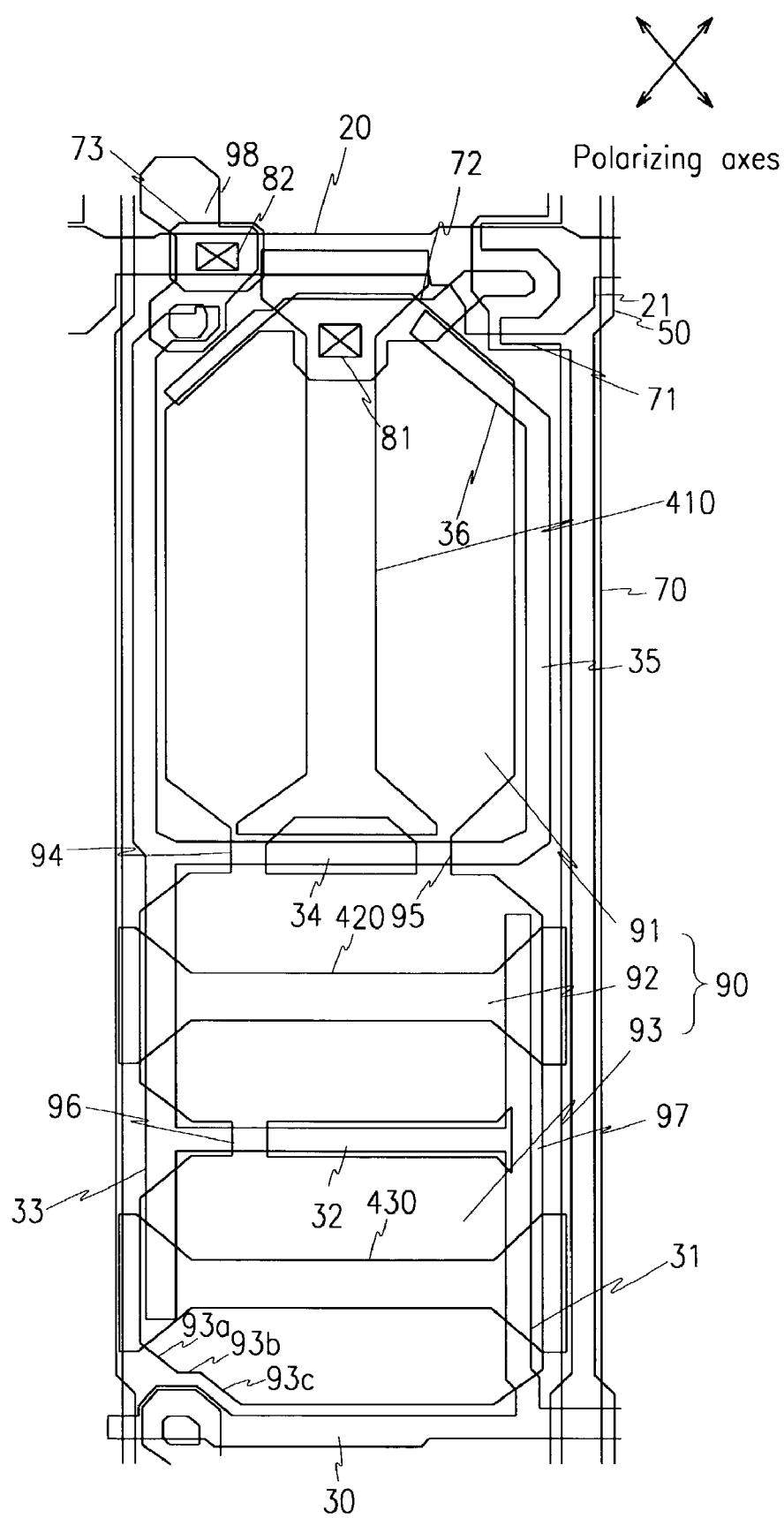

FIGS. 2A, 2B, and 2C are layout views of a TFT array panel, a color filter array panel, and an LCD manufactured by assembling the panels according to the second embodiment of the present invention, respectively.

Referring to FIG. 2A, except for a chamfer shape of the lower left corner in a pixel electrode 90 of a TFT array panel, an LCD according to the second embodiment has substantially the same structure as that according to the first embodiment. The second embodiment is different from the first embodiment in that a lower left corner of a lower partition 93 is chamfered in stepwise manner. According to an embodiment of the present invention, the corner includes a first oblique portion 93a extending in an oblique direction, a transverse portion 93b which is connected to the first oblique portion 93a and extends in the transverse direction, and a second oblique portion 93c which is connected to the transverse portion 93b and extends in the oblique direction.

In this embodiment, the transverse portion 93b of the lower partition 93 causes the liquid crystal molecules near the corner to be tilted in the main tilt direction, in which the liquid crystal molecules near the long sides tilt. Therefore, texture near the corner is reduced.

An LCD according to the third embodiment of the present invention will be described.

Figure 3A:
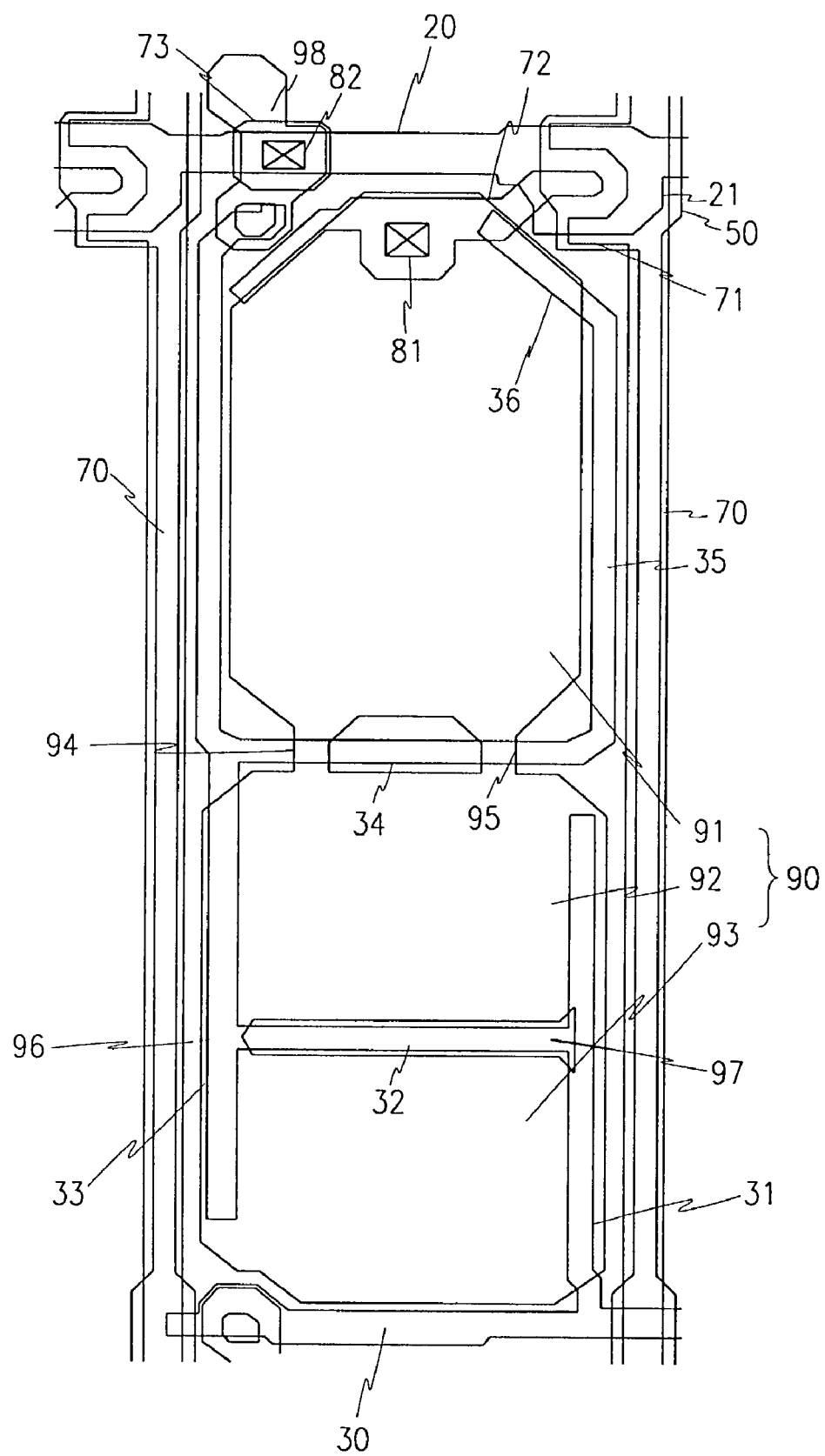
Figure 3B:
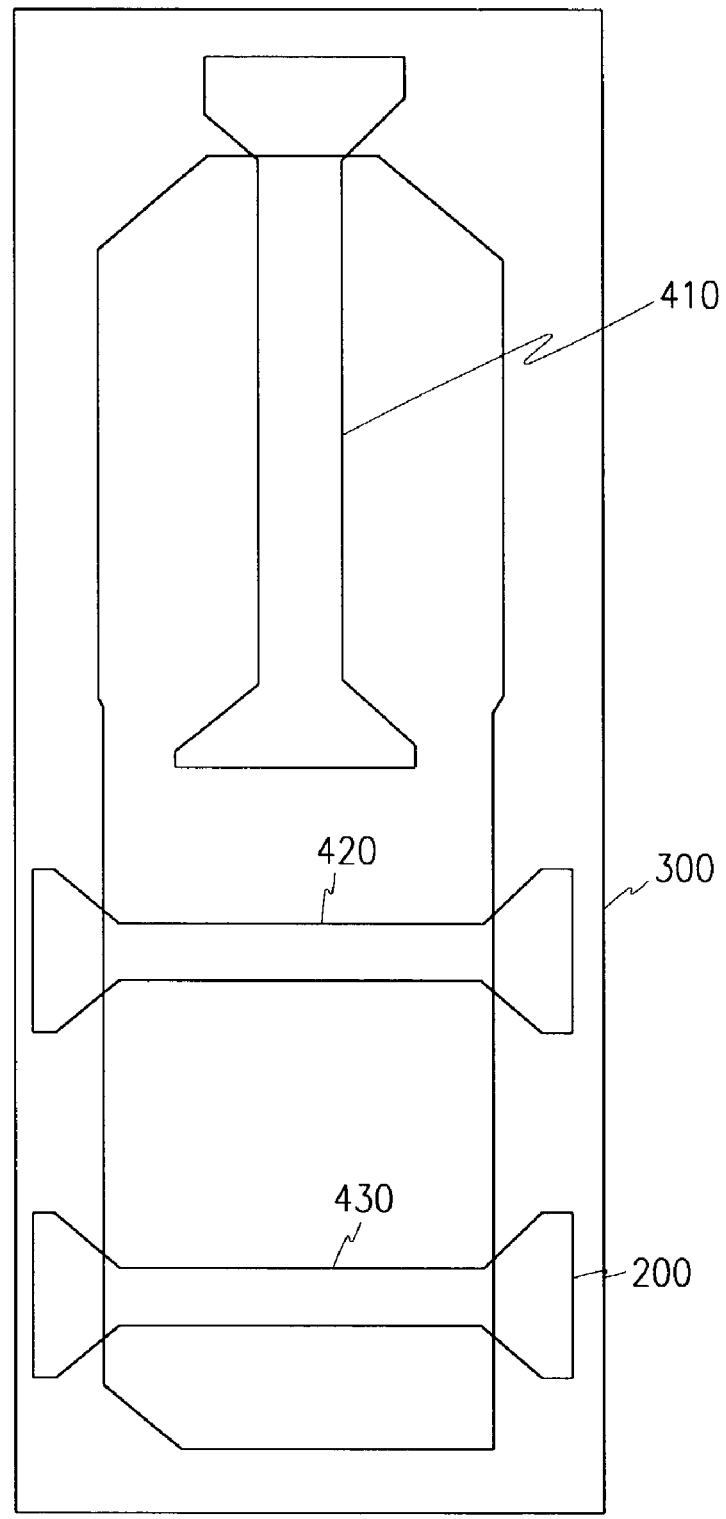
Figure 3C:
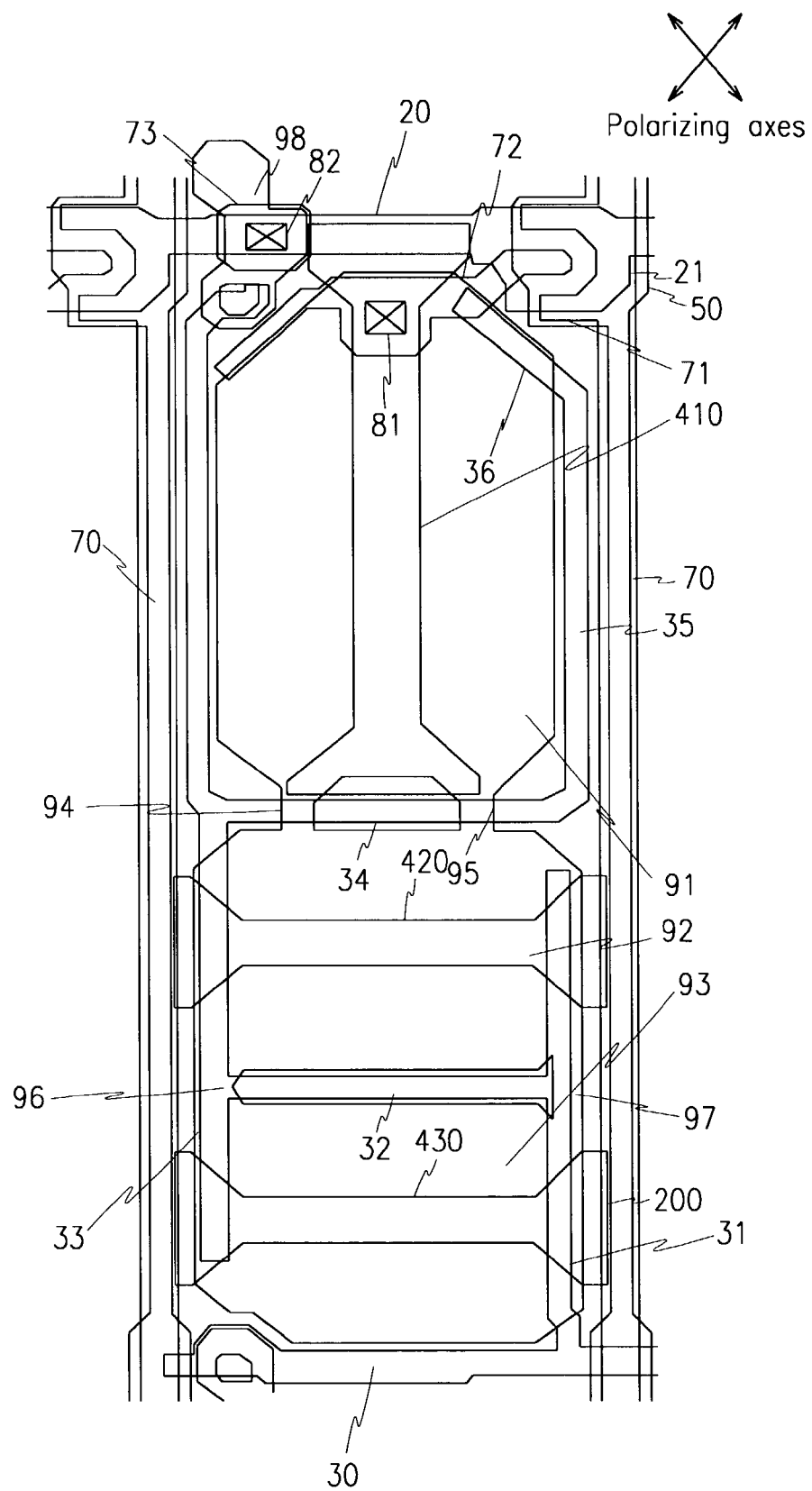

FIGS. 3A, 3B, and 3C are layout views of a TFT array panel, a color filter array panel, and an LCD manufactured by assembling the panels according to the third embodiment of the present invention, respectively.

Referring to FIG. 3A, except for the position and the shape of two connecting members 96 and 97 connecting middle and lower partitions 92 and 93 of a pixel electrode 90 of the TFT array panel, an LCD according to the third embodiment has substantially the same structure as that according to the second embodiment. The third embodiment is distinguished from the second embodiment in that the connecting member 96 is located at the left edge of the pixel electrode 90 and covers a connection between storage electrodes 32 and 33.

As a modified example of the third embodiment, corners of the middle and the lower partitions 92 and 93 of the pixel electrode 90 adjacent to the connecting member 96 are chamfered.

An LCD according to the fourth embodiment of the present invention will be described.

Figure 4A:
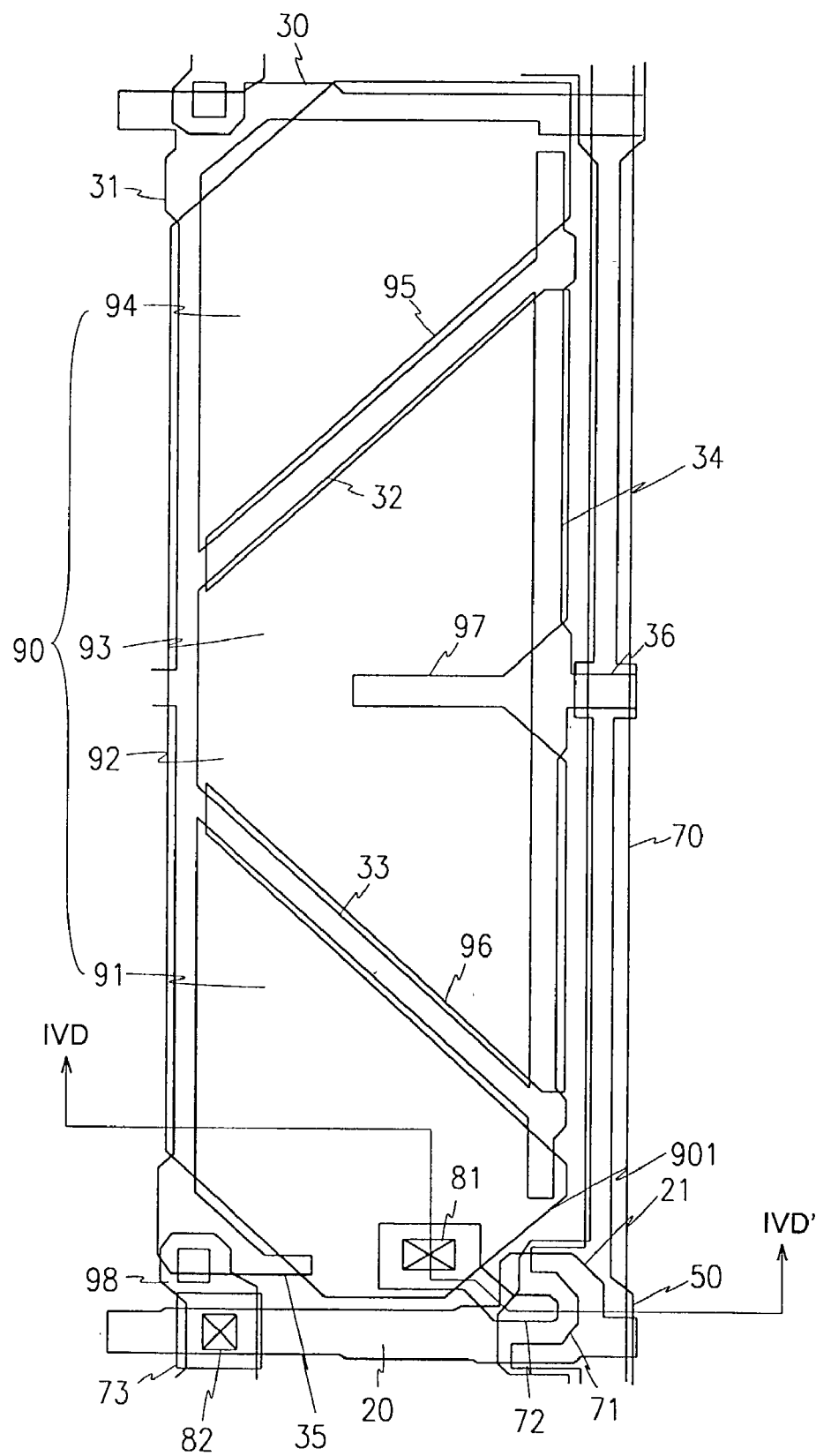
Figure 4B:
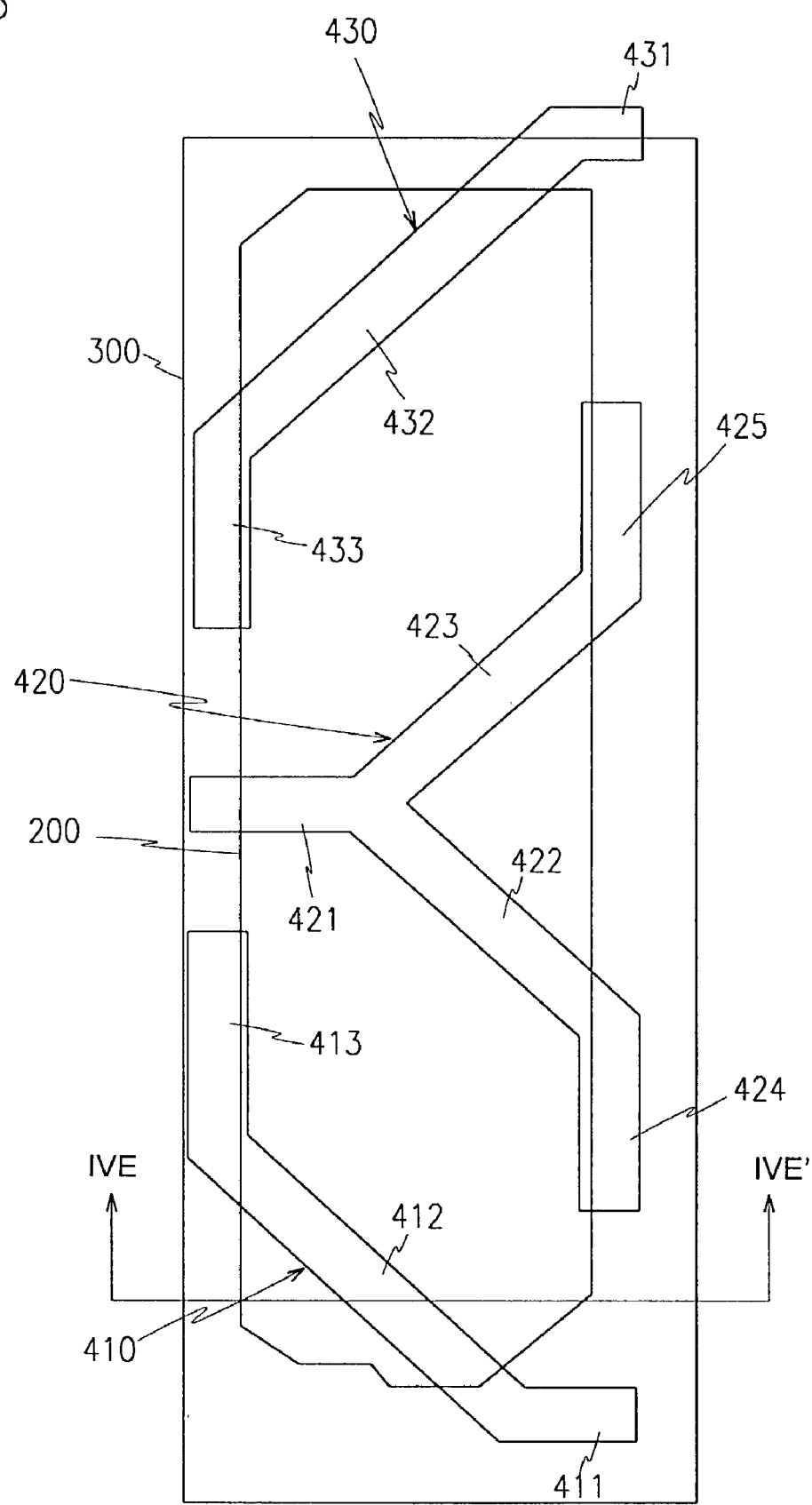
Figure 4C:
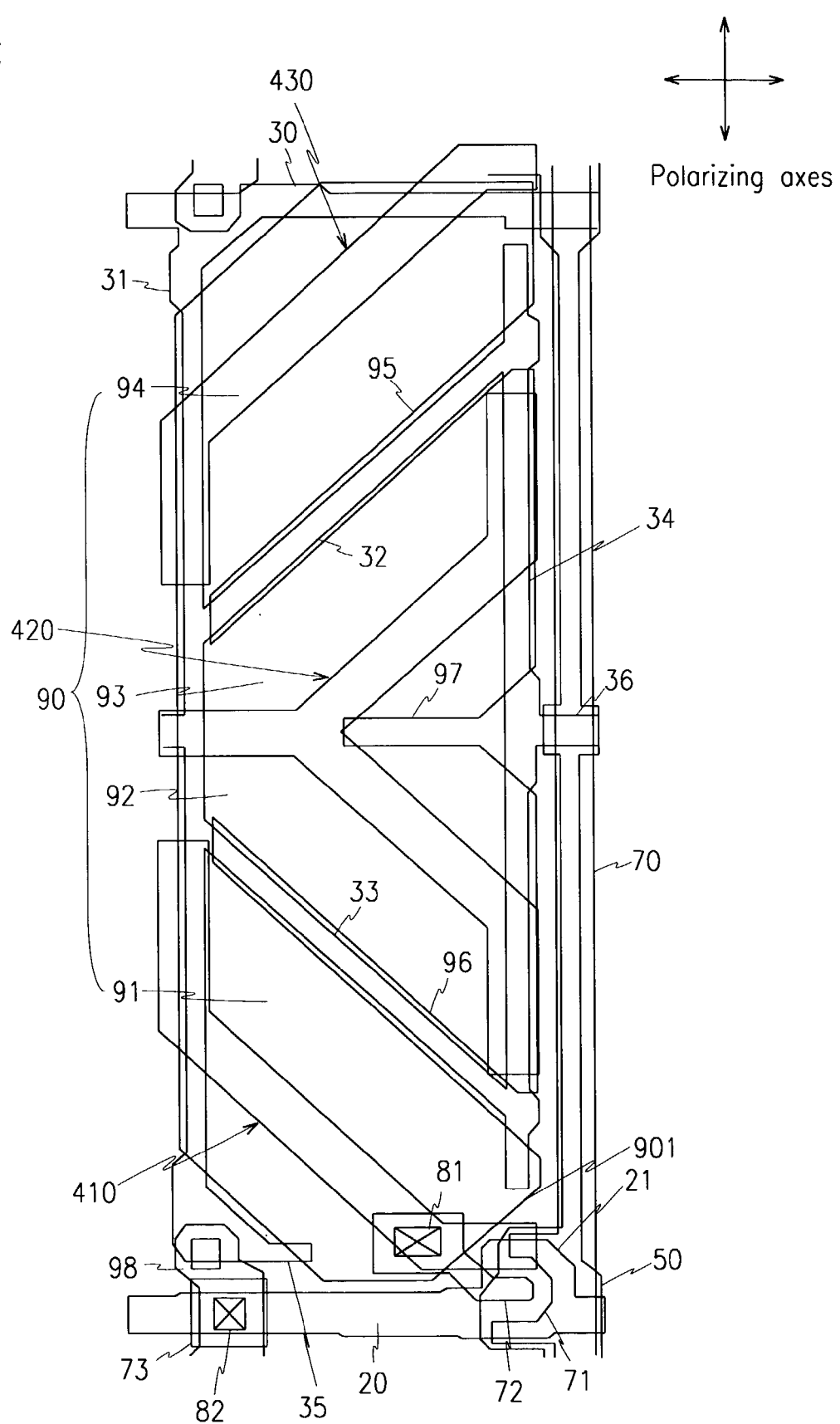
Figure 4D:
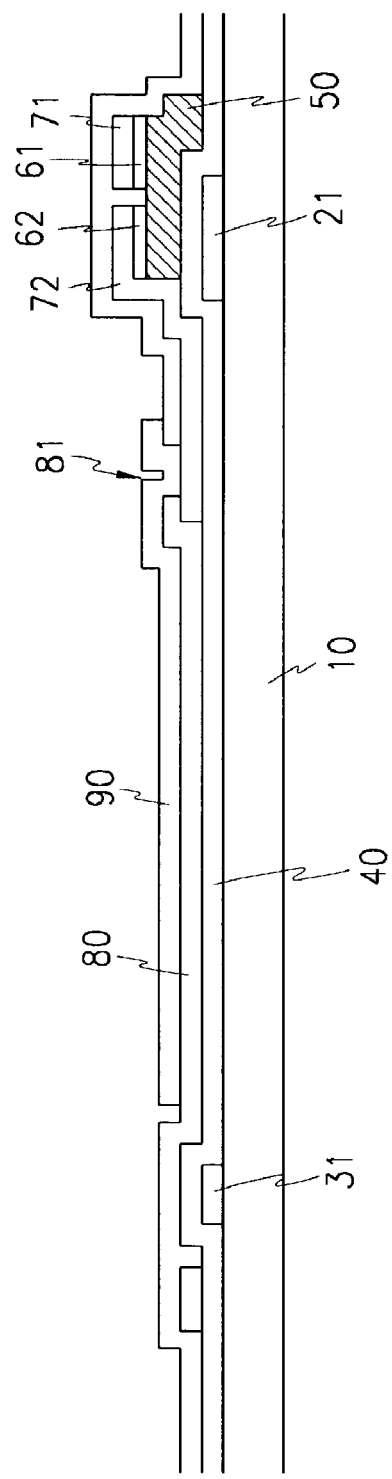
FIG. 4D is a cross-sectional view of the TFT array panel taken along the line IVD–IVD' of FIG. 4A.
Figure 4E:
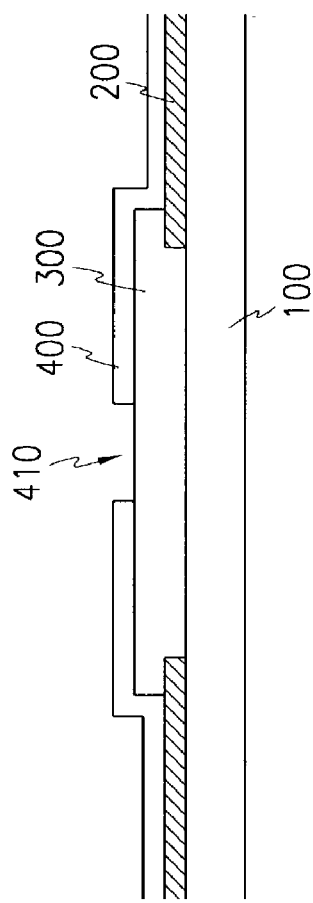
FIG. 4E is a cross-sectional view of the color filter array panel taken along the line IVE–IVE' of FIG. 4B.

FIGS. 4A, 4B, and 4C are layout views of a TFT array panel, a color filter array panel, and an LCD manufactured by assembling the panels according to the fourth embodiment of the present invention, respectively. FIGS. 4D and 4E are sectional views taken along lines IVD–IVD' and IVE—IVE of FIGS. 4A and 4B, respectively.

A TFT array panel for the LCD according to the fourth embodiment will be described with reference to FIG. 4A and 4D.

A gate wire including a gate line 20 and a gate electrode 21 and a storage electrode wire including storage electrode line 30, first to fifth storage electrodes 31–35, and a storage electrode connecting member 36 are formed on an insulating substrate 10 preferably made of transparent glass. The storage electrode wire is applied with a voltage different from that applied to a pixel electrode 90 which will be described later. The gate line 20 extends in a transverse direction and the gate electrode 21 extends upward and downward from the gate line 20. The storage electrode line 30 extends parallel to the gate line 20, the first to fifth storage electrodes 31–35 are branches of the storage electrode line 30. The first storage electrode 31 having an end directly connected to the storage electrode line 30 and extends in a longitudinal direction. The second and the third storage electrodes 32 and 33 obliquely extend toward upper right and lower right directions from upper middle and lower middle positions of the first storage electrode 31, respectively. The other ends of the second and the third storage electrodes 32 and 33 are connected to the respective ends of the fourth storage electrode 34 extending in the longitudinal direction. The fifth storage electrode 35 has an end connected to the lower end of the first storage electrode 31 and extends shortly in the transverse direction. The storage electrode connecting member 36 is connected to substantially a midpoint of the fourth storage electrode 34 and the first storage electrode of a neighboring pixel.

The gate wire and the storage electrode wire are covered with a gate insulating film 40. A semiconductor layer 50, preferably made of amorphous silicon, is formed on the gate insulating layer 40 opposite the gate electrode 21. Ohmic contact layers 61 and 62, preferably made of amorphous silicon heavily doped with N-type impurity such as phosphorus, is formed on the semiconductor layer 50.

A data wire including a plurality of data lines 70, a source electrode 71, and a drain electrode 72 and a buffer 73 are formed on the gate insulating layer 40 and the ohmic contact layers 61 and 62. The plurality of data lines 70 extends in the longitudinal direction, and a pixel area is defined by intersections of two adjacent data lines 70 and two adjacent gate lines 20. Under the data line 70, the ohmic contact layer 61 and the semiconductor layer 50 also preferably extend along the data line 70, as shown in the figures. The source electrode 71 and the drain electrode 72 are disposed on the respective ohmic contact layers 61 and 62. The source electrode 71 having a U-shape is a branch of the data line 70 and separated from the drain electrode 72. There is exposed a portion of the semiconductor layer 50 disposed between the source and the drain electrodes 71 and 72. The buffer 73 having a rectangular shape is disposed on the gate insulating film 40 and separated from the date wire.

The gate, the source, and the drain electrodes 21, 71, and 72 form three terminals of a TFT, which has the portion of the semiconductor layer 50 disposed between the source and the drain electrodes 71 and 72 as a channel layer. The TFT is connected to the gate line 20, the data line 70 and the pixel electrode 90, and transmits the image signals from the data lines 70 to the pixel electrode 90 in response to the scanning signals from the gate line 20.

The data wire, the buffer 73, and the exposed portion of the semiconductor layer 50 are covered with a passivation film 80 having contact holes 81 and 82, which expose the drain electrode 72 and a portion of the buffer 73, respectively.

The pixel electrode 90 located in the pixel area and having a rectangular shape, and a repairing connection 98 intersecting the gate line 20 are formed on the passivation film 80. The pixel electrode 90 and the repairing connection 98 are made of transparent conductive material such as ITO (indium tin oxide) and IZO (indium zinc oxide), or opaque conductive material.

The pixel electrode 90 is connected to the drain electrode 72 through the contact hole 81 and the repairing connection 98 is connected to the buffer 73 through the contact hole 82. The repairing connection 98 also extends in the longitudinal direction to overlap the storage electrode line 30 above the buffer 73 and the extended end of the first storage electrode 31 below the buffer 73.

The pixel electrode 90 includes first to fourth partitions 91–94, which are arranged in the longitudinal direction, divided by three openings 95–97 extending toward the left side from the right side. The partitions 91–94 are connected to each other near their left edges since the openings 95–97 do not completely pass through the pixel electrode 90. Two openings 95 and 96 extend along the second and the third storage electrodes 32 and 33, respectively, and the opening 97 extends in the transverse direction toward the left from around the midpoint of the right edge of the pixel electrode 90. An entrance of the opening 97 is in the shape of a funnel, which becomes widened as approaching to the right edge of the pixel electrode 90, and a left end of the opening 97 is located near the center of the pixel electrode 90, which is different from the other openings 95 and 96.

The pixel electrode 90 has upper left, lower left and lower right corners, which are chamfered, and covers substantially all the first and the fourth storage electrodes 31 and 34 extending in the longitudinal direction. That is, both ends of the first storage electrode 31 and portions of the fourth storage electrode 34 near the entrances of the openings 95–97 are not covered with the pixel electrode 90. The first partition 91, the lowest one among the four partitions 91–94, is directly connected to the drain electrode 72 through the contact hole 81. It is preferable that oblique edges of the pixel electrode 90 curve at an angle of about 120 to about 150 degrees (or about 30 to about 60 degrees) with the other edges, and more preferably about 135 degrees (or about 45 degrees).

Next, a color filter array panel according to the fourth embodiment of the present invention will be described with reference to FIGS. 4B and 4E.

A black matrix 200 preferably made of organic material is formed on a transparent insulating substrate 100 preferably made of glass to define the pixel area. A color filter 300 is formed in the pixel area of the substrate 100. A common electrode 400 preferably made of transparent conducting material is formed on the color filter 300, and preferably covers the entire surface of the substrate 100. The common electrode 400 has lower, middle, and upper apertures 410, 420, and 430, and most of the lower, middle, and upper apertures 410, 420, and 430 obliquely pass through the pixel area. The lower aperture 410 has a transverse portion 411, an oblique portion 412, and a longitudinal portion 413. The transverse portion 411 extends along the lower edge of the pixel area from the lower right corner of the pixel area. The oblique portion 412 is connected to the transverse portion 411, obliquely extends toward an upper left side, and reaches the left edge of the pixel area. The longitudinal portion 413 is connected to the oblique portion 412 and extends in the longitudinal direction along the left edge of the pixel area. The middle aperture 420 has a transverse portion 421, first and second oblique portions 422 and 423, and first and second longitudinal portions 424 and 425. The transverse portion 421 extends in the transverse direction parallel to the gate line 20 from substantially a midpoint of the left edge of the pixel area. The first and the second oblique portions 422 and 423 are commonly connected to the transverse portion 421, obliquely extending toward lower right and upper right directions, respectively, and reach the right edge of the pixel area. The first and the second longitudinal portions 424 and 425 are connected to the first and the second oblique portions, respectively, and extend in the lower and upper directions along the right edge of the pixel area, respectively. The upper aperture 430 is substantially symmetrical to the lower aperture 410 with respect to the middle aperture 420, and has a transverse portion 431, an oblique portion 432 and a longitudinal portion 433. The transverse portion 431 extends along the upper edge of the pixel area from the upper right corner of the pixel area. The oblique portion 432 is connected to the transverse portion 431 and obliquely extending toward a lower left direction, and reaches the left edge of the pixel area. The longitudinal portion 433 is connected to the oblique portion 432 and extends in the longitudinal direction along the left edge of the pixel area.

According to an embodiment of the present invention, the black matrix can have a double-layered structure of $Cr/CrO_2$, and the color filter can be formed in the TFT array panel instead.

Then, an LCD according to the fourth embodiment of the present invention will be described with reference to FIG. 4C.

After the TFT array panel of the FIG. 4A and the color filter array panel of FIG. 4B are assembled, liquid crystal material is injected into the gap between the two panels and vertically aligned, and two polarizers (not shown) are attached to the outer surfaces of the panels so that their polarizing axes are perpendicular to each other, thereby preparing the LCD according to the fourth embodiment. The polarizing axes are parallel to the gate line 20 or the data line 70.

When the two panels are aligned, the common electrode 400 of the color filter array panel is opposite the pixel electrode 90 of the TFT array panel and generates an electric field along with the pixel electrode 90. The partitions 91-94 of the pixel electrode 90 and the apertures 410, 420, and 430 of the common electrode 400 overlap each other, thereby dividing a pixel region into a number of domains. The pixel region is defined as a portion of the liquid crystal layer between the corresponding pixel areas of both panels. The lower and the upper apertures 410 and 430 divide each of the first and the fourth partitions 91 and 94 of the pixel electrode 90 into two obliquely arranged domains. The middle aperture 420 divides each of the second and the third partitions 92 and 93 into two obliquely arranged domains extending, and the opening 97 of the pixel electrode 90 overlaps the middle aperture 420 of the common electrode 400. The planar shape of each domain has a long stripe having two oblique long sides parallel to each other, and the long sides of each domain curve at an angle of approximately 45 degrees with the polarizing axes of the polarizer. In addition, the long sides are two types, extending toward the upper right direction and the lower right direction. The two types of the long sides curve at an angle of about 85 to about 95 degrees with each other. These are made by the shapes of the partitions 91–94 and the apertures 410, 420, and 430.

According to an embodiment of the present invention, texture is easily removed by modifying the shape of the apertures. In addition, the texture generated at the oblique sides parallel or perpendicular to the polarizing axes is weaker than one generated in a T-shaped pattern since the storage electrodes are covered with the pixel electrode or the apertures.

An LCD according to the fifth embodiment of the present invention will be described.

Figure 5A:
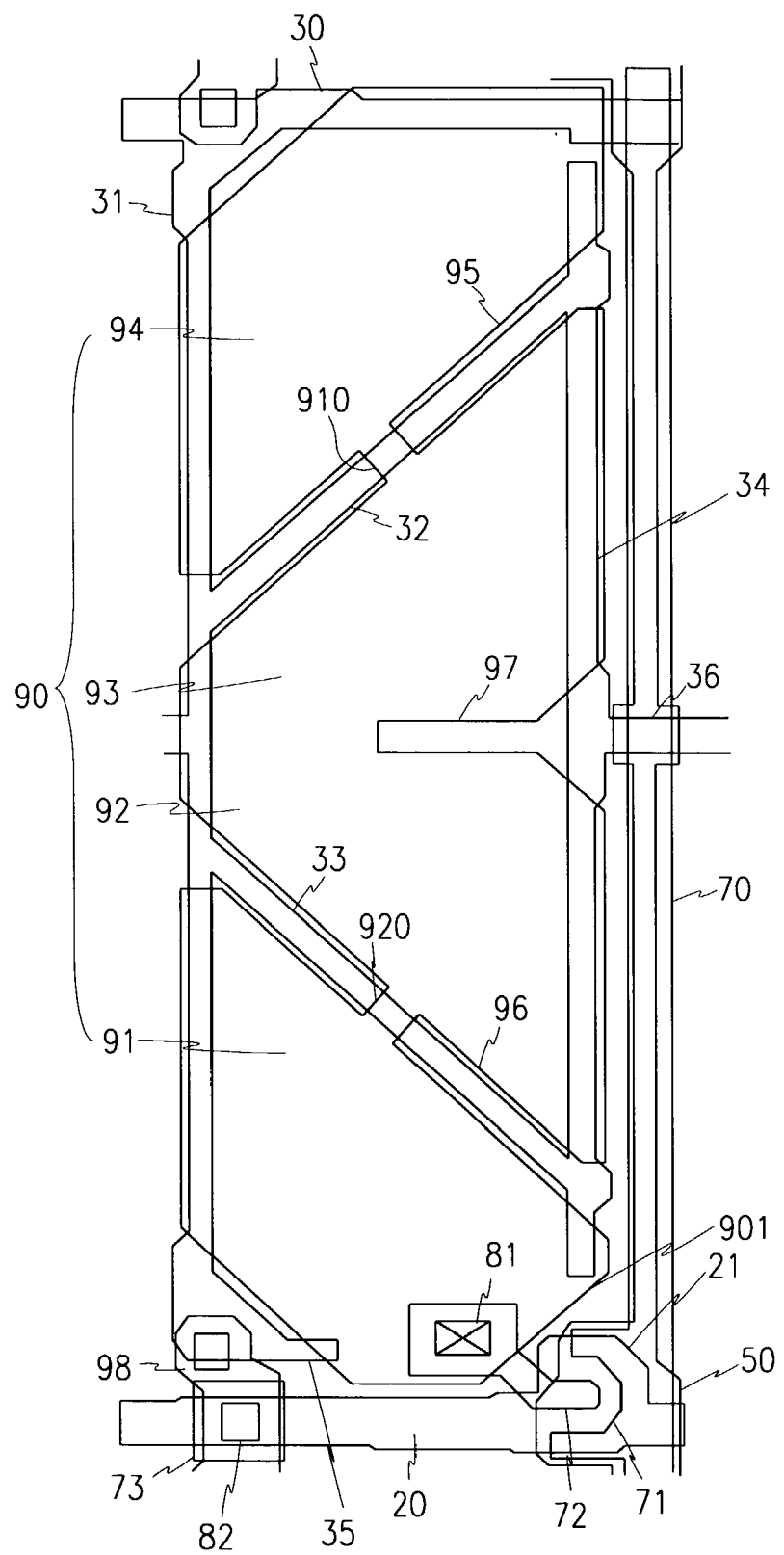
Figure 5B:
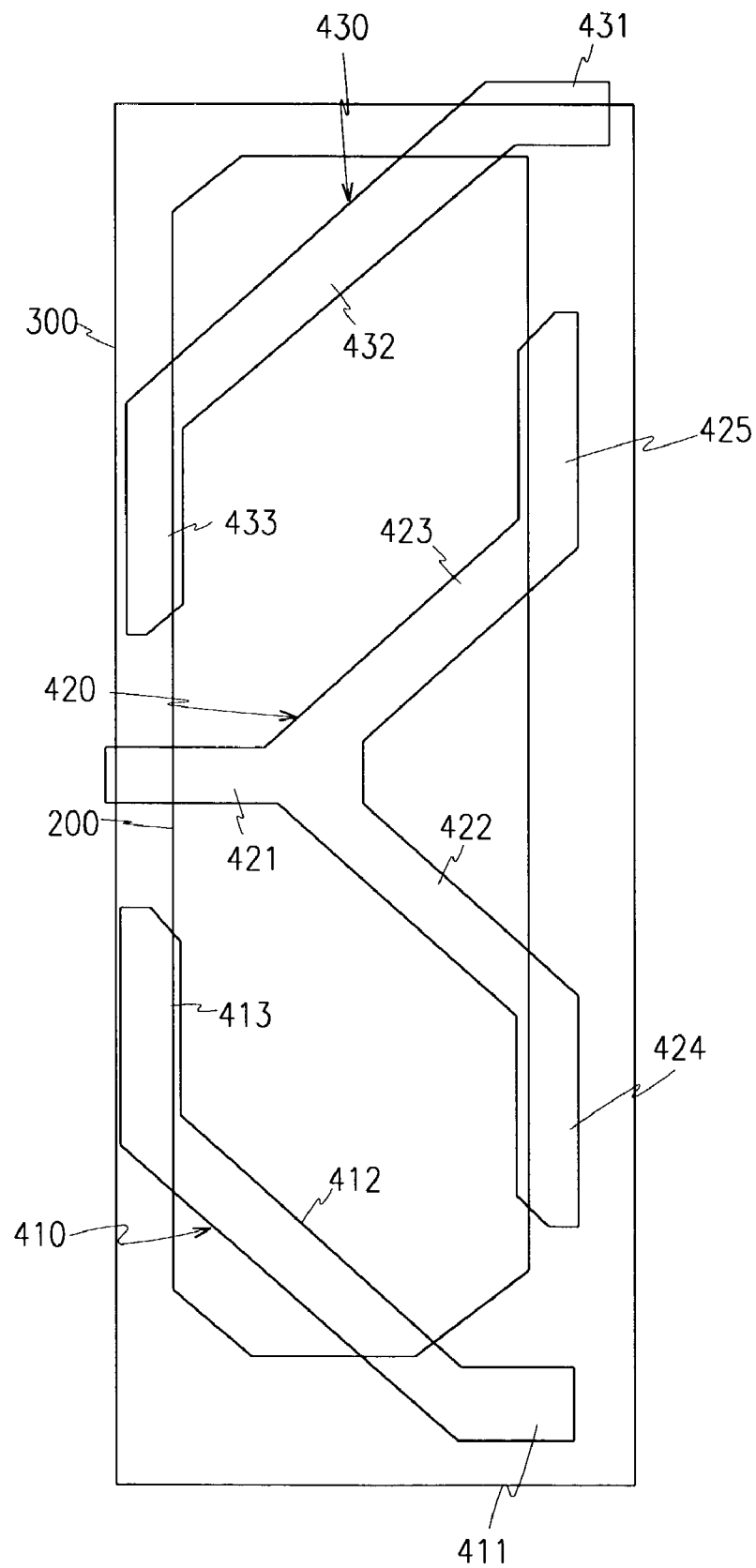

FIGS. 5A, 5B, and 5C are layout views of a TFT array panel, a color filter array panel, and an LCD manufactured by assembling the panels according to the fifth embodiment of the present invention, respectively.

Referring to FIG. 5A, except for positions where the partitions 91 and 92 are connected and the partitions 93 and 94 are connected, an LCD according to the fifth embodiment has substantially the same structure as that according to the fourth embodiment. The fifth embodiment is different from the fourth embodiment in that a connecting member 910 connecting the partitions 91 and 92 and a connecting member 920 connecting the partitions 93 and 94 are located at substantially a midpoint of the openings 95 and 96 of the pixel electrode 90, respectively, and the partitions 91-94 are not connected to each other at the left edge of the pixel electrode 90.

In this embodiment, the oblique sides bent in the longitudinal direction at the long sides in the domains adjacent to the connecting members 910 and 920 are shortened, thereby reducing texture generated at the oblique sides by the storage electrode wire.

The present invention has domains having oblique sides shorter than the short sides to obtain sufficient aperture ratio and prevent textures. In addition, the extended drain electrode covering oblique sides elongated by the repairing connection.

In the drawings and specification, there have been disclosed typical preferred embodiments of the present invention and, although specific terms are employed, they are used in a generic and descriptive sense only and not for purposes of limitation, the scope of the invention being set forth in the following claims.

What is claimed is:

1. A liquid crystal display comprising:
 a pixel electrode having a plurality of partitions connected to each other;
 a common electrode opposite the pixel electrode, the common electrode generating an electric field along with the pixel electrode and having a plurality of apertures, the plurality of partitions and the plurality of apertures defining domains; and
 a gate line for transmitting a first signal and a data line for transmitting a second signal, the gate line insulated from but intersecting the data line,
 wherein at least one of the domains has at least one oblique side that is oblique to the length direction of the domain and is a side of the pixel electrode and has at least one pair of sides parallel to each other, and
 wherein the at least one obligue side is formed with a stairs shape and includes a portion parallel to the gate line or the data line.

2. The liquid crystal display of claim 1, further comprising:
 a first wire adjacent to the pixel electrode and applied with a voltage different from a voltage applied to the pixel electrode.

3. The liquid crystal display of claim 2, further comprising a repairing connection intersecting the gate line and overlapping a part of the first wire.

4. The liquid crystal display of claim 3, further comprising a switching element, connected to the gate line, the data line, and the pixel electrode, for supplying the second signal from the data line for the pixel electrode in response to the first signal from the gate line.

5. The liquid crystal display of claim 4, wherein a portion of the switching element extends between the pixel electrode and the first wire.

6. The liquid crystal display of claim 2, wherein at least one of connecting members connecting the plurality of partitions of the pixel electrode substantially covers the first wire.

7. The liquid crystal display of claim 1, wherein the oblique side comprises an edge of the apertures of the common electrode or a chamfered corner of the plurality of partitions of the pixel electrode.

8. The liquid crystal display of claim 1, wherein the oblique side curves at an angle of about 120 to about 150 degrees with the length direction of the domain.

9. The liquid crystal display of claim 1, wherein the oblique side curves at an angle of about 135 to about 180 degrees with the length direction of the domain.

10. The liquid crystal display of claim 1, further comprising at least a second oblique side.

11. A panel for a liquid crystal display, the panel comprising:
 a pixel electrode having a plurality of partitions connected to each other and having at least one oblique side that is a side of the pixel electrode;

a first wire adjacent to the pixel electrode and applied with a voltage different from a voltage applied to the pixel electrode; and a switching element connected to the pixel electrode, supplying a signal to the pixel electrode, and having a gate electrode connected to a gate line, a source electrode connected to a data line, and a drain electrode, wherein the drain electrode comprises a stem portion connected to the pixel electrode and a branch portion branched out from the stem portion and extends along the at least one oblique side of the pixel electrode, and wherein the at least one oblique side includes a portion parallel to the gate line or the data line and is formed with a stairs shape.

12. The panel of claim 11, wherein at least one of connecting members connecting the plurality of partitions of the pixel electrode covers the first wire.

13. The panel of claim 11, further comprising a gate line for transmitting a first signal and a data line for transmitting a second signal, the gate line insulated from but intersecting the data line.

14. The panel of claim 11,
wherein the pixel electrode includes a plurality of partitions connected to each other with connecting members, and
at least one of the connecting members connecting the plurality of partitions of the pixel electrode covers the first wire.

15. The panel of claim 14, wherein a portion of the switching element extends between the pixel electrode and the first wire.

16. The panel of claim 14, wherein the pixel electrode has at least four sides including at least one pair of sides parallel to each other and at least one oblique side that is longer than at least one other side and oblique to the gate line or the data line.

17. The panel of claim 16, wherein said at least four sides is five sides, and the at least one oblique side that is longer than at least one other side is longer than two sides.

18. The panel of claim 11, further comprising at least a second oblique side.

19. The panel of claim 11, wherein the at least one of the domains has at least four sides including at least one pair of sides parallel to each other and at least one oblique side that is longer than at least one other side and oblique to the length direction of the domain.

20. The panel of claim 19, wherein said at least four sides is five sides, and the at least one oblique side that is longer than at least one other side is longer than two sides.

21. A liquid crystal display comprising:
a pixel electrode having a plurality of partitions connected to each other: and
a common electrode opposite the pixel electrode, the common electrode generating an electric field along with the pixel electrode and having a plurality of apertures, the plurality of partitions and the plurality of apertures defining domains,
wherein at least one of the domains has at least one obligue side that is oblique to the length direction of the domain and is a side of the pixel electrode and has at least one pair of sides parallel to each other, and
wherein the at least one of the domains has at least four sides including at least one pair of sides parallel to each other and at least one oblique side that is longer than at least one other side and oblique to the length direction of the domain.

22. The liquid crystal display of claim 21, wherein said at least four sides is five sides, and the at least one oblique side that is longer than at least one other side is longer than two sides.

* * * * *